May 11, 1948.　　A. RASPET　　2,441,167
HELICAL SPRING
Original Filed March 27, 1942
Fig. 1.
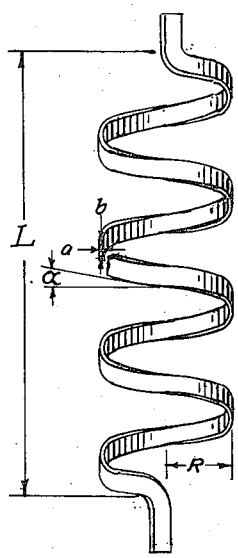
Fig. 2.
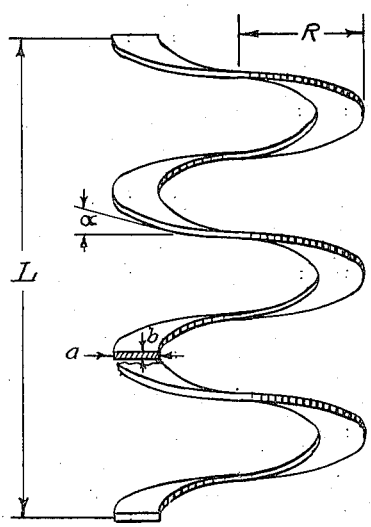
Fig. 3.
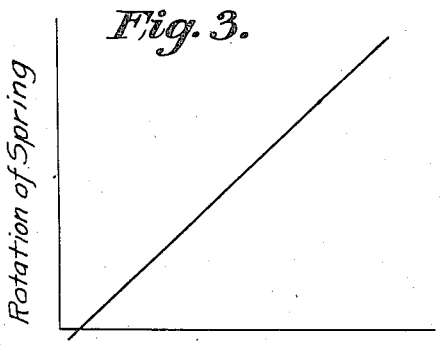
Logarithm of Spring's Length
Fig. 4.
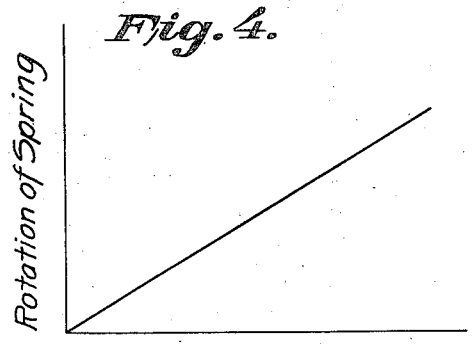
Square of Spring's Length
Fig. 5.
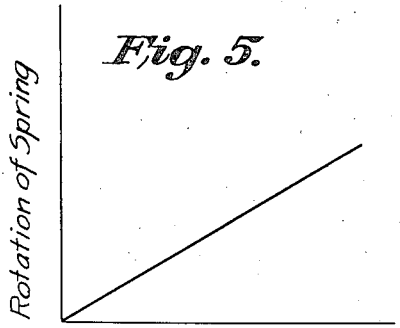
Spring Length
$$\text{I} \, \text{C} \, \text{C} \, \text{I} \, \text{J} \, \text{()} \, \text{()}$$
a　b　c　d　e　f　g
Fig. 6.
INVENTOR
AUGUST RASPET
BY
ATTORNEY

UNITED STATES PATENT OFFICE 2,441,167

HELICAL SPRING

August Raspet, Locust Valley, N. Y.

Original application March 27, 1942, Serial No. 436,390, now Patent No. 2,402,666, dated June 25, 1946. Divided and this application June 7, 1946, Serial No. 675,129

1 Claim. (Cl. 267—1)

(Granted under the act of March 3, 1883, as amended April 30, 1928; 370 O. G. 757)

The invention described herein, if patented, may be manufactured and used by or for the Government for governmental purposes without the payment to me of any royalty thereon.

This case is a division of my application Serial No. 436,390, filed March 27, 1942, now Patent No. 2,402,666, June 25, 1946.

My invention relates to helical springs of the type which wind or unwind upon elongation. These springs have been constructed empirically with the result that their rotational response to elongation was not a determinable function of that elongation. Therefore, such springs were not suitable for use in measuring instruments, and their use was especially objectionable in instruments produced in quantity.

An object of this invention is to provide a helical spring the behavior of which can be predicted with mathematical exactness.

The features of the invention are illustrated in the accompanying drawing, wherein:

Fig. 1 is a view in elevation of a helical spring formed of an elastic strip having its width parallel to the axis of the helix;

Fig. 2 is a view similar to Fig. 1, but showing a spring formed of an elastic strip with its width parallel to the radii of the helix;

Figs. 3, 4 and 5 are graphs illustrating the logarithmic, parabolic and linear responses respectively of helical springs made according to this invention; and Fig. 6 is a detail view illustrating a representative group of cross sections of elastic strips which may be used in constructing helical springs.

Helical springs constructed of an elastic strip will wind or unwind when elongated according to the relative rigidity of the cross section of the strip to bending as compared to the section's torsional rigidity. The tendency of such a spring to wind or unwind depends upon the relative torsional and bending rigidities of the strip, as well as upon the pitch angle and the radius of the helix. Specifically this invention proposes to utilize the variation in pitch angle to obtain certain mathematical relationships between the elongation and the amount of turning of the helical spring.

In the illustration Fig. 1 the strip is a flat ribbon wound with its greater cross-sectional dimension parallel to the axis of the helix. In this configuration of the helical spring the spring tends to unwind when elongated. The basic reason for this behavior lies in the fact that the potential energy of such a spring is stored in the bending and in twisting of the cross section of the strip. In the spring illustrated in Fig. 1 the energy stored in bending the cross section about a radius of the section at that point is greater than that stored in twisting the section. This results in a rotation of the free end of the spring in such a direction that the spring unwinds.

On the other hand, if the spring is wound as shown in Fig. 2, the spring is more rigid to torsion than to bending in its section and there consequently results a tendency for the spring to wind up.

A more rigorous description of the behavior of a helical spring is that furnished by mathematical analysis. The earliest mathematical analysis of the behavior of helical springs dates to Mossotti 1817. Later, Kirchoff, Thomson and Tait, and Clebsch added their endeavors to the solution of the problem. Formally the treatment of this problem consists in setting up the relation expressing the potential energy of the spring in terms of the various parameters. The potential energy is differentiated for the incremental rotation and elongation. The resulting relations for a flat strip of radial thickness $a$ and longitudinal width $b$ are:

$$\Delta\Phi = LRw \sin\alpha \cos\alpha \left(\frac{ab^3q}{12} - a^3b\left(\frac{16}{3} - 3.36\frac{a}{b}\right)n\right) \quad [1]$$

$$\Delta L = LR^2w\left(\frac{12\sin^2\alpha}{ab^3q} + \frac{\cos^2\alpha}{a^3b\left(\frac{16}{3} - 3.36\frac{a}{b}\right)n}\right) \quad [2]$$

where $w$ is the axial force tending to elongate the spring,
$R$ is the radius of the helix,
$L$ is the length of the helix,
$\alpha$ is the pitch angle of the helix,
$q$ is the Young's modulus of the material of the elastic strip,
$n$ is the shear modulus of the material of the elastic strip,
$\Delta\Phi$ is the incremental rotation,
$\Delta L$ is the incremental elongation.

(A) This invention is based on the principle discovered by applicant that from the quotient of the above relations the "rotatory magnification"

$$\frac{d\Phi}{dL}$$

expressed as turns of the spring per unit elongation can be obtained. The magnification is found to be:

$$\frac{d\Phi}{dL} = \frac{\left(\frac{ab^3q}{12} - a^3b\left(\frac{16}{3} - 3.36\frac{a}{b}\right)n\right)}{R\left(\frac{ab^3q}{12}\tan\alpha + a^3b\left(\frac{16}{3} - 3.36\frac{a}{b}\right)n \operatorname{ctn}\alpha\right)} \quad [3]$$

The "rotatory magnification" is shown by this newly discovered relation to be clearly dependent on the radius R of the spring; the smaller the radius the greater the magnification. Further, it can be seen from this relation that the magnification will be greatest when the value of $a:b$ departs substantially from unity. In the case where $$\frac{a}{b}$$

is small (much less than unity) the spring will be as in Fig. 1. In the second case, $a:b$ much greater than unity, the spring will have the configuration of Fig. 2.

(B) When the ratio $a:b$ is small (Fig. 1) the rotary magnification becomes:

$$\frac{d\Phi}{dL} = \frac{1 - 64\left(\frac{a}{b}\right)^2 \frac{n}{q}}{R\left(\tan\alpha + 64\left(\frac{a}{b}\right)^2 \frac{n}{q}\operatorname{ctn}\alpha\right)} \quad [4]$$

Having determined R, $$\frac{a}{b}$$

and having selected a material with a certain $$\frac{n}{q}$$

as shown by newly discovered relation [3] above, the magnification is then dependent only on the value of $\alpha$. It is the essence of this invention to control the variation in magnification by selecting the angle "$\alpha$" so that over suitably restricted ranges of operation limited by the elastic properties of the spring material the rotation of the spring will follow a predetermined mathematical relationship.

(B-1) It may happen, for example, in altimeters, that a logarithmic relationship of rotation and elongation is desired. Such a condition obtains if:

$$\frac{d\Phi}{dL} = -\frac{k}{L} = -\frac{k}{2\pi R\Phi \tan\alpha} \quad [5]$$

where $\Phi$ = the total turns of spring, and $k$ is a constant.

From newly discovered relations [5] and [4], it follows that for this condition:

$$-\frac{k}{2\pi R\Phi \tan\alpha} = \frac{\left(1 - 64\left(\frac{a}{b}\right)^2 \frac{n}{q}\right)}{R\left(\tan\alpha + 64\left(\frac{a}{b}\right)^2 \frac{n}{q}\operatorname{ctn}\alpha\right)} \quad [6]$$

A solution of the latter equation for $\alpha$ furnishes the value of the pitch angle of the helical spring for which the rotatory magnification is inversely proportional to the length of the spring; wherefore the rotation of the spring is proportional to the logarithm of the length of the spring. This functional relation, when the rotation is plotted against the logarithm of the spring's length, graphs as a straight line, Fig. 3.

(B-2) In another application of the helical spring described herein one may desire a parabolic relation between the rotation and the length of the spring, viz:

$$\Phi = cL^2 \quad [7]$$

where $c$ is a constant.

Such a behavior is attained as above shown when the rotary magnification obeys the following relation:

$$\frac{d\Phi}{dL} = 2cL \quad [8]$$

or $$4c\pi R\Phi \tan\alpha = \frac{1}{R}\left[\frac{1 - 64\left(\frac{a}{b}\right)^2 \frac{n}{q}}{\tan\alpha + 64\left(\frac{a}{b}\right)^2 \frac{n}{q}\operatorname{ctn}\alpha}\right] \quad [9]$$

When this equation is solved for $\alpha$, the helical spring constructed with that value of $\alpha$ will possess a parabolic relation between rotation and the length of the spring. For such a behavior a graph of the rotation of the spring against the square of the length of the spring will be a straight line. Such a graph is shown in Fig. 4. A spring of this design used in an airspeed indicator results in a uniform scale of speed instead of the usual non-uniform scale.

(B-3) The most common use of helical springs which wind or unwind is that in which a uniform rotatory response to elongation is desired (Fig. 5). For this, the linear case, the rotatory magnification must be constant with changes in length of the spring:

$$\frac{d\Phi}{dL} = h, \quad [10]$$

where $h$ is a constant; or $$h = \frac{1}{R}\left[\frac{1 - 64\left(\frac{a}{b}\right)^2 \frac{n}{q}}{\tan\alpha + 64\left(\frac{a}{b}\right)^2 \frac{n}{q}}\right] \quad [11]$$

Solving the last equation for $\alpha$ will furnish the pitch angle around which the helical spring will behave linearly. In the field of instrumentation this type of spring has wide application to pressure gauges, vacuum gauges, barometers and electrical measuring instruments.

(C) For illustrating the method described in this invention the mathematical formulae have been developed for the case of a helical spring wound of a flat ribbon of an elastic material. It must be emphasized that the method is perfectly general in that one may simply substitute for the torsional and bending energy relations on the flat strip the relations applying to cross sections of other configurations. It happens that the greatest magnification is obtained by the use of a flat strip, but for certain applications other cross sectional forms may be desired. Various cross sections of springs which will respond to this treatment are illustrated in Fig. 6, cross sections $a$ to $g$, inclusive.

From the foregoing description of preferred embodiments of my invention it will be readily apparent to those skilled in the art that the invention is not limited to the particular embodiments disclosed to illustrate the same.

What is claimed is:

A helical spring in which the helix angle is so selected that the "rotatory magnification" expressed as turns of the spring per unit elongation is directly proportional to its length; that is, in which $$\frac{d\Phi}{dL} = kL,$$

where $$\frac{d\Phi}{dL}$$

is the "rotatory magnification" expressed as turns of the spring per unit elongation, L is the length of the helix and $k$ is a constant, where the pitch angle ($\alpha$) is given by solving the equation hereinafter following after introducing the selected values of radial thickness ($a$), the longitudinal width ($b$), the Young's modulus ($q$) and the shear modulus ($n$), where R is the radius of the spring, $\Phi$ the total number of turns of the spring and ($c$) is a constant of sensitivity; the equation being:

$$4c\pi R\Phi \tan \alpha = \frac{1}{R} \frac{\left(1 - 64\left(\frac{a}{b}\right)^2 \frac{n}{q}\right)}{\left(\tan \alpha + 64\left(\frac{a}{b}\right)^2 \frac{n}{q} \operatorname{ctn} \alpha\right)}$$

which, when solved for tan $\alpha$, yields:

$$\tan \alpha = \sqrt{\frac{1 - 64\left(\frac{a}{b}\right)^2 \frac{n}{q}}{4c\pi R^2 \Phi} - 64\left(\frac{a}{b}\right)^2 \frac{n}{q}}$$

AUGUST RASPET.